Sept. 4, 1956
N. H. DITRICK
2,761,800
METHOD OF FORMING P-N JUNCTIONS IN N-TYPE GERMANIUM
Filed May 2, 1955
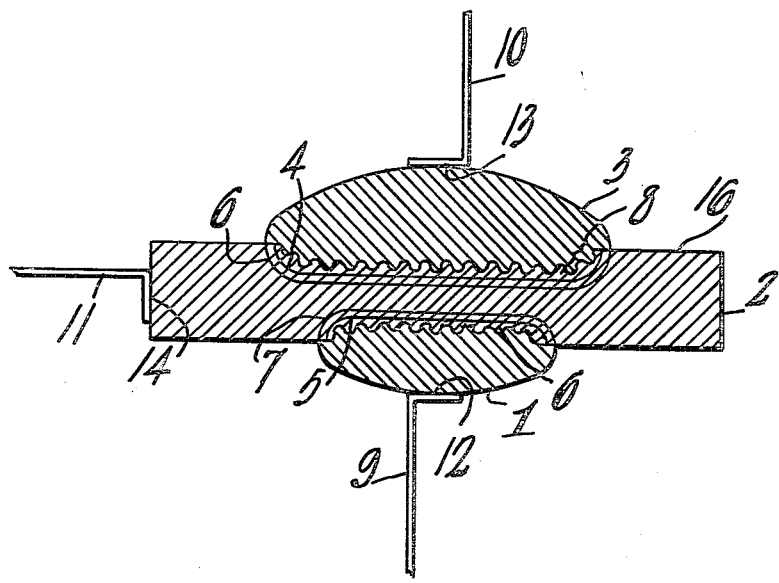
INVENTOR.
Norman H. Ditrick
BY
J. C. Whittaker
ATTORNEY

United States Patent Office 2,761,800
Patented Sept. 4, 1956

2,761,800

METHOD OF FORMING P-N JUNCTIONS IN N-TYPE GERMANIUM

Norman H. Ditrick, East Orange, N. J., assignor to Radio Corporation of America, a corporation of Delaware Application May 2, 1955, Serial No. 505,397

18 Claims. (Cl. 148—1.5)

This invention relates generally to an improved method for making a p–n rectifying barrier by fusing an indium body to a germanium body. More particularly, but not necessarily exclusively, the invention relates to an improved method useful, for example, in the manufacture of junction type semi-conductive devices, for establishing controllable amounts of flux material at the point where it is desired to fuse an indium electrode to a surface portion of a germanium wafer.

It is known to form semi-conductive devices having p–n rectifying barriers. Such devices comprise a body of semi-conducting material having a zone of p-type conductivity separated from a zone of n-type conductivity by a rectifying barrier. An example of such a device is one made by fusing a pellet of a material, such as indium, capable of imparting p-type conductivity to semi-conducting germanium, to a wafer of n-type conductivity germanium. Part of the germanium wafer melts, alloys with a portion of the indium, and then recrystallizes to form a p-type conductivity zone. Thus a rectifying barrier region is formed between the p-type zone and the remainder of the n-type body. A suitable flux for wetting indium and germanium satisfactorily at relatively low temperatures is zinc chloride. Zinc chloride fluxes, however, dissolve indium and re-deposite part of it as metallic indium on the germanium surface. This deposite should be removed, as by etching, before the germanium with the indium electrode pellet thereon can be alloyed or fused at the high temperature required to obtain penetration of the indium in the germanium.

It is therefore an object of this invention to provide an improved method for cleanly fusing or alloying an indium body to a germanium body to make a p–n rectifying barrier device while maintaining the flux precisely at the point where the joinder of the two bodies is to be made.

It is a further object of the invention to provide an improved method for establishing the requisite flux precisely at the point required and in controllable amounts for fusing an indium body to a germanium body to make a p–n rectifying device.

Another object is to provide improved methods of fabricating semi-conductor rectifying devices.

These and other objects and advantages of the invention are accomplished in accordance with a typical form of the invention by alloying an indium body with zinc and thereafter fusing or alloying this body to a germanium wafer in the presence of a salt or a mixture of salts which either decompose or react upon being heated to produce a decomposition or reaction product capable of reacting with the zinc in the electrode to form zinc chloride flux.

The invention will be described in greater detail in connection with the drawing wherein:

The sole figure is a schematic elevational cross-sectional view of a junction type semi-conductive device formed in accordance with the instant invention.

Throughout the specification and appended claims the terms "fusing" or "alloying" are intended to distinguish over "soldering" which implies the joinder of two bodies by a third material. As used herein the terms "fusing" and "alloying" are intended to cover the direct joinder of at least surface portions of two bodies without the use of a third material.

In accordance with one embodiment of a method of carrying out the invention, a pellet or junction electrode body is first prepared by alloying gross amounts of zinc and indium. The alloy percentage of zinc to indium depends upon the amount necessary to produce the desired amount of zinc chloride flux. About one-half of one percent of zinc was found to yield satisfactory results for semi-conductive devices made according to the invention. Thus, each 200 g. of indium is alloyed with 1 gram of zinc. Any desired amount of zinc chloride can be formed according to the instant invention by controlling the percentage of the zinc present as an alloy constituent with the indium.

The alloyed zinc and indium is rendered into sheet stock and cylindrical junction electrode bodies are punched therefrom. The thickness of the sheet stock is about 15 mils. In a typical device made according to the invention an emitter electrode body was 15 mils in diameter and the collector electrode body about 45 mils in diameter. As an illustrative example, these electrode bodies, as punched from the sheet stock, are cylindrical although other shapes, such as spheres, may be employed if desired. Thus, the emitter body comprised about 0.31 mg. of indium and 0.0016 mg. of zinc. The collector body comprised about 2.8 mg. of indium and 0.014 mg. of zinc.

Referring to the drawing, the germanium wafer 2 may be of any convenient size such as ⅛" x ⅛" x .01" thick. In order to form p–n rectifying barriers with indium the germanium should be doped (as with arsenic) so as to be of n-type conductivity. The wafer is initially cut from a relatively large single crystal of germanium having a resistivity of about 0.5 to 5 ohm-cm. It is etched in a mixture of hydrofluoric and nitric acids saturated with iodine or bromine to reduce its thickness to about .005", to remove disturbed surface layers and contaminating matter and to provide a clean, crystallographically undisturbed surface. At the regions of the wafer 2 where it is desired to fuse indium electrodes 1 and 3 a fluxing material containing a substance capable of producing hydrochloric acid is introduced. Such a substance may be, for example, ammonium chloride, or hydrazine monohydrochloride, or a mixture of ammonium chloride and hydrazine monohydrobromide. When heated at the relatively low temperature (about 300° C.) at which indium fuses with germanium, ammonium chloride and hydrazine monohydrochloride decompose to form hydrochloric acid:

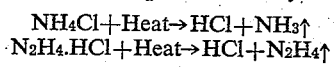

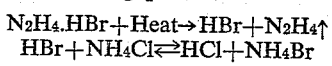

In the case of a mixture of ammonium chloride and hydrazine monohydrobromide, hydrochloric acid is formed by the following process:

$$N_2H_4.HBr + Heat \rightarrow HBr + N_2H_4\uparrow$$
$$HBr + NH_4Cl \rightleftharpoons HCl + NH_4Br$$

Inasmuch as the decomposition of hydrazine monohydrobromide takes place at a much lower temperature (about 190° C.) than the decomposition of ammonium chloride (300° C.), by providing an excess amount of ammonium chloride an active flux having a much wider temperature range is obtained than in the case of single salts. Thus at a relatively low temperature the hydrazine monohydrobromide decomposes to yield hydrogen bromide which reacts with the ammonium chloride to form hydrochloric acid. This reaction is independent of temperature. When all of the hydrazine monohydrobromide is depleted by this reaction, it is still possible to continue to produce hydrochloric acid by raising the temperature to the point where the remaining ammonium chloride will decompose as shown previously.

After the introduction of the salt or salts described, the indium-zinc alloy cylindrical electrode bodies or pellets are brought into contact for the fusing step. The bodies and the wafer are heated in an ordinary air atmosphere, for example, to about 300° C. whereupon the salt between the bodies and the wafer decomposes to yield hydrochloric acid as just described. In the case of a mixture of ammonium chloride and hydrazine monohydrobromide a much lower temperature, for example 190° C., may be employed to produce the acid. Upon reaching the indium-germanium alloying temperature the indium melts and assumes the ellipsoid or dot-like shape as shown in the figure. The zinc alloyed with the indium in the electrode or dot reacts with the hydrochloric acid to form zinc chloride as follows:

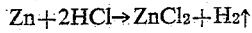

$$Zn + 2HCl \rightarrow ZnCl_2 + H_2 \uparrow$$

The indium melts at about 155° C. but even at temperatures up to 300° C. dissolves only minute proportions of germanium. The flux operates to induce wetting of the germanium by the indium causing the indium pellet to flatten out upon the germanium wafer and to adhere firmly thereto. The degree of flattening of the electrode material may be controlled by varying the temperature of the heating step, higher temperatures producing somewhat greater flattening. When indium is used, the temperature is preferably limited to about 250°–325° C. to provide a substantial thickness of indium above the germanium surface, forming a hat-like profile.

The amount of zinc chloride produced as a flux is thus limited by the amount of zinc in the zinc-indium alloy, as pointed out previously, and by the size of the electrode body. Since the zinc chloride is formed precisely where needed, only a small quantity is required. In the case of an emitter electrode such as described previously containing 0.31 mg. of indium and 0.0016 mg. of zinc, about 0.0033 mg. of zinc chloride is formed. For a collector such as described previously containing 2.8 mg. of indium and 0.014 of zinc, about 0.029 mg. of zinc chloride is formed. It should be appreciated that the establishment of such controllably minute quantities of zinc chloride at exactly the point where desired for successfully alloying indium to germanium would be an extremely difficult, if not impossible, accomplishment without the instant invention.

The wafer 2 and the electrodes 1 and 3 may be heated from 1 to 5 minutes to bring them to equilibrium and to fuse the pellets or dots into the wafer. It has been found that, in general, heating for about 1 minute is sufficient to establish this equilibrium although longer heating periods may be employed if desired. In the case of rectifying junction-type semi-conductive devices only one such electrode need be fused to the germanium wafer. For transistor or amplifier junction-type semi-conductive devices, such as shown in the figure and described, at least two such electrodes are needed. The deepest point of penetration into the wafer is called the alloy front and is shown by the lines 4 and 5 for each electrode. During the fusing process a portion of the wafer is dissolved into the molten pellets. During cooling recrystallized regions 5 and 6, rich in indium, and integral parts of the wafer are formed adjacent the alloy fronts for each electrode. These regions have p-type conductivity. P–n rectifying barriers 7 and 8 are thus formed adjacent the alloy fronts. Electrical leads 9, 10, and 11 may be attached by non-rectifying solder connections 12, 13, and 14 to the emitter electrode 1, the collector electrode 3 and the wafer 2, respectively. In the case of a simple rectifying junction-type device one of the electrodes and its lead are omitted.

While the invention has been described as preferably using hydrochloric acid-yielding salts such as ammonium chloride, hydrazine monohydrochloride, and hydrazine monohydrobromide, it is by no means limited to these materials. Many suitable hydrochloric acid-yielding salts are available as shown in the following table. This table does not purport to be a complete listing of all available suitable salts but is only illustrative of the range of possible choices thereof.

*Hydrochloric acid-yielding fluxes*

| Formula | Name |
| --- | --- |
| $C_{20}H_{24}N_2O_2 \cdot HCl \cdot H_2O$ | Quinidine Hydrochloride. |
| $C_{20}H_{24}N_2O_2 \cdot 2HCl$ | Quinine Dihydrochloride. |
| $C_{20}H_{24}O_2N_2 \cdot HCl$ | Quinine Monohydrochloride. |
| $C_{21}H_{22}N_2O_2 \cdot HCl$ | Strychnine Hydrocloride. |
| $C_{19}H_{21}NO_3 \cdot HCl$ | Thebaine Hydrochloride. |
| $C_{15}H_{19}NO_2 \cdot HCl$ | Tropacocaine Hydrochloride. |
| $C_8H_{11}NO_3 \cdot HCl$ | Pyridoxine Hydrochloride. |
| $C_{21}H_{26}N_2O_3 \cdot HCl$ | Yohimbine Hydrochloride. |
| $C_{34}H_{40}O_{11}N \cdot HCl$ | Aconitine Hydrochloride. |
| $C_{12}H_{15}NO_3 \cdot HCl$ | Anhalonine Hydrochloride. |
| $C_8H_{13}NO_2 \cdot HCl$ | Arecoline Hydrochloride. |
| $C_{20}H_{19}NO_5 \cdot HCl$ | Berberine Hydrochloride. |
| $C_9H_{15}NO_3 \cdot HCl$ | 1-Ecogonine Hydrochloride. |
| $C_{29}H_{40}N_8O_4 \cdot 2HCl$ | Emetine Hydrochloride. |
| $C_{19}H_{37}NO_4 \cdot HCl$ | Eucaine Hydrochloride. |
| $C_5H_9NO_4 \cdot HCl$ | L-Glutamic Acid Hydrochloride. |
| $C_6H_9N_3O_2 \cdot 2HCl$ | L-Histidine Dihydrochloride. |
| $C_{16}H_{21}NO_3 \cdot HCl$ | Homatropine Hydrochloride. |
| $C_{21}H_{21}NO_6 \cdot HCl$ | Hydrastine Hydrochloride. |
| $C_{11}H_{11}NO_2 \cdot HCl$ | Hydrastinine Hydrochloride. |
| $C_{21}H_{23}NO_5 \cdot HCl$ | Diacetyl Morphine Hydrochloride. |
| $C_{19}H_{23}NO_3 \cdot 2HCl$ | Ethyl Morphine Hydrochloride. |
| $C_{23}H_{27}NO_8 \cdot HCl$ | Narceine Hydrochloride. |
| $C_{19}H_{21}NO_3 \cdot HCl$ | Oxyacanthine Hydrochloride. |
| $NH_2OH \cdot HCl$ | Hydroxylamine Hydrochloride. |
| $C_6H_5NH_2 \cdot HCl$ | Aniline Hydrochloride. |
| $C_2H_5NH_2 \cdot HCl$ | Ethylamine Hydrochloride. |
| $C_{10}H_7NH_2 \cdot HCl$ | Naphthylamine Hydrochloride. |
| $(C_2H_5)_3N \cdot HCl$ | Triethylamine Hydrochloride. |
| $(CH_3)_3N \cdot HCl$ | Trimethylamine Hydrochloride. |
| $(NH_2)_2C_6H_3OH \cdot 2HCl$ | Diaminophenol Hydrochloride. |
| $CH_3(CH_2)_{11}NH_3Cl$ | Dodecylamine Hydrochloride. |

After the fusing step the unit is cooled and rinsed in methanol or preferably in a 2% solution of concentrated nitric acid in methanol. It is then dipped for a second or so into a solution of one part nitric acid, one part hydrofluoric acid and eight parts water by volume. The rinsing and the acid dip remove substantially all the salts left by the flux and also serve to clean the surface of other contamination. In particular, it is desirable to remove any indium, zinc or other contaminants which may have been deposited on the exposed surface of the germanium wafer adjacent to the electrode.

The device may then be mounted and potted according to conventional techniques utilized in connection with germanium semi-conductor devices.

There thus has been described an improved method for cleanly fusing or alloying indium electrodes to germanium wafers to make a junction-type semi-conductive device. While the invention has been described with particular reference to the manufacture of semi-conductive devices, especially of the transistor type, it should be appreciated that it is not necessarily limited thereto but may be employed to advantage wherever it is desired to form p–n rectifying junctions by fusing or alloying indium and germanium. Furthermore, while the above described reactions are believed to be those occuring in the process of the invention, it should be understood that the invention is not predicated solely upon the correctness of this explanation.

What is claimed is:

1. The method of fusing an indium body to a surface portion of an n-type germanium body to form a p–n rectifying barrier comprising the steps of: alloying indium with zinc, forming a body of said indium-zinc alloy and heating said indium-zinc body in contact with said germanium body at said surface portion thereof with a fluxing material therebetween which is capable of producing hydrochloric acid, said heating being at a temperature exceeding the melting point of said indium-zinc body and above the decomposition temperature of said fluxing material.

2. The invention according to claim 1 wherein said fluxing material is a heat-decomposable chloride one of whose decomposition products is hydrochloric acid.

3. The method of making a semiconductor device comprising alloying to a surface portion of a body of semi-conducting n-type germanium an electrode body composed of an alloy of indium and zinc, said alloying being carried out by placing a fluxing material which is capable of producing hydrochloric acid on the surface of said germanium body where said zinc-indium alloy body is to be alloyed, heating said bodies at a temperature high enough to cause said fluxing material to produce hydrochloric acid, contacting said bodies at the portion of said germanium body where said hydrochloric acid is being formed, and subsequently heating said bodies to the alloying temperature thereof.

4. The method according to claim 3 wherein said fluxing material is a mixture of ammonium chloride and hydrazine monohydrobromide.

5. The method according to claim 3 wherein said fluxing material is a heat-decomposable chloride.

6. The method according to claim 5 wherein said fluxing material is ammonium chloride.

7. The method according to claim 5 wherein said fluxing material is hydrazine monohydrochloride.

8. The method of making a semi-conductor device comprising alloying to a surface portion of a body of semi-conducting n-type germanium an electrode body composed of an alloy of from 0.2 to 0.5% zinc in indium, said alloying being carried out by placing a fluxing material which is capable of producing hydrochloric acid on the surface of said germanium body where said zinc-indium alloy body is to be alloyed, heating said bodies at a temperature high enough to cause said fluxing material to produce hydrochloric acid, contacting said bodies at the portion of said germanium body where said hydrochloric acid is being formed, and subsequently heating said bodies to the alloying temperature thereof.

9. In the method of making p–n rectifying junction-type semi-conductive devices comprising a body of n-type germanium and an indium electrode body, the steps of: alloying indium with a predetermined amount of zinc, forming an electrode body of said indium-zinc alloy, contacting zinc-indium alloy electrode body to said germanium body with a fluxing material therebetween which is capable of producing hydrochloric acid, and heating said bodies to liberate said hydrochloric acid and to fuse said indium electrode body to said germanium body in the presence of zinc chloride which is formed by the reaction of said hydrochloric acid and said zinc alloyed in said electrode body whereby said bodies form a p–n barrier therebetween.

10. In the method of making p–n rectifying junction-type semi-conductive devices comprising a body of n-type germanium and an indium electrode, the steps of: forming an electrode body of indium alloyed with zinc as a minor constituent thereof, contacting said electrode body to said germanium body with a fluxing material therebetween which is capable of producing hydrochloric acid, and heating said bodies at a temperature high enough to cause said fluxing material to produce hydrochloric acid and to alloy said bodies to form a p–n barrier therebetween.

11. The method of fusing an indium body to an n-type germanium body to form a p–n rectifying barrier comprising the steps of: alloying indium with 0.2 percent zinc, forming a body of said indium-zinc alloy, contacting said zinc-indium alloy body to said germanium body, and heating said bodies with a fluxing material therebetween which is capable of producing hydrochloric acid to a temperature which is above the fusing temperature of said bodies and also sufficient to produce said acid.

12. In the method of making junction-type semi-conductive devices comprising an n-type germanium wafer and an indium electrode, the steps of: forming an electrode body of indium alloyed with 0.2 percent zinc as a constituent thereof, contacting said electrode body to said germanium wafer with a fluxing material therebetween which is capable of producing hydrochloric acid and heating said wafer and said electrode body to a temperature sufficient to partially alloy said wafer and said electrode body to form a p–n rectifying barrier, said temperature also being sufficient to decompose said fluxing material to produce said hydrochloric acid.

13. A method of fusing an indium body to a surface portion of an n-type germanium body to form a p–n rectifying barrier comprising the steps of: alloying indium with a small predetermined amount of zinc, forming a body of said indium-zinc alloy, placing a fluxing material which is capable of decomposing at a temperature lower than 325° C. to produce hydrochloric acid on the surface of said germanium body where said zinc-indium alloy body is to be fused, contacting said bodies to the portion of said germanium body where said fluxing material is, and heating said bodies to a temperature between 250° C. and 325° C. for a period of about one to five minutes whereupon said indium body is fused to said germanium body and whereby a p–n rectifying barrier is formed.

14. The method according to claim 13 wherein said fluxing material is a mixture of ammonium chloride and hydrazine monohydrobromide.

15. The method according to claim 13 wherein said fluxing material is a heat-decomposable chloride.

16. The method according to claim 15 wherein said fluxing material is ammonium chloride.

17. The method according to claim 15 wherein said fluxing material is hydrazine monohydrochloride.

18. A method of fusing an indium body to a surface portion of an n-type germanium body to form a p–n rectifying barrier comprising the steps of: alloying indium with a small predetermined amount of zinc, forming a body of said indium-zinc alloy, placing a fluxing material which is capable of decomposing at a temperature lower than 325° C. to produce hydrochloric acid on the surface of said germanium body where said zinc-indium alloy body is to be fused, contacting said bodies to the portion of said germanium body where said fluxing material is, heating said bodies to a temperature between 250° C. and 325° C. for the period of about one minute whereupon said indium body is fused to said germanium body to form a p–n rectifying barrier, and thereafter treating said fused bodies so as to clean the surfaces thereof.

References Cited in the file of this patent

UNITED STATES PATENTS

| | | |
|---|---|---|
| 1,293,823 | Luckey | Feb. 11, 1919 |
| 1,882,734 | Barber | Oct. 18, 1932 |
| 2,603,693 | Kircher | July 15, 1952 |
| 2,721,965 | Hall | Oct. 25, 1955 |